US012647393B2

(12) United States Patent
Yao et al.

(10) Patent No.: US 12,647,393 B2
(45) Date of Patent: Jun. 2, 2026

(54) MULTI-TENANT RESOLVER FOR PRIVATE COMMUNICATIONS

(71) Applicant: Oracle International Corporation, Redwood Shores, CA (US)

(72) Inventors: Shitong Yao, San Jose, CA (US); Hochak Hung, Belmont, CA (US); Thomas Baby, Maple Valley, CA (US); Suman Kumar, San Mateo, CA (US); Uday Kiran Jangolla, Hyderabad (IN); Kumar Rajamani, San Ramon, CA (US)

(73) Assignee: Oracle International Corporation, Redwood Shores (CA)

( * ) Notice: Subject to any disclaimer, the term of this patent is extended or adjusted under 35 U.S.C. 154(b) by 513 days.

(21) Appl. No.: 17/958,183

(22) Filed: Sep. 30, 2022

(65) Prior Publication Data

US 2024/0114003 A1     Apr. 4, 2024

(51) Int. Cl.
*H04L 9/40*          (2022.01)
(52) U.S. Cl.
CPC ............................... *H04L 63/0263* (2013.01)
(58) Field of Classification Search
CPC . H04L 63/0281; H04L 61/4511; H04L 41/00; H04L 41/0897; H04L 41/432; H04L 41/50; H04L 63/0272; H04L 67/56; H04L 67/567; H04L 63/0227; H04L 63/0263; H04L 63/0254; H04L 63/0245; H04L 63/0236
USPC .............................................. 726/13, 12, 14
See application file for complete search history.

(56) References Cited

U.S. PATENT DOCUMENTS

| | | | | |
|---|---|---|---|---|
| 10,931,561 B2 * | 2/2021 | Parla | ................... | H04L 12/4641 |
| 11,283,763 B2 * | 3/2022 | Rudnik | .............. | H04L 63/0236 |
| 2004/0249973 A1 * | 12/2004 | Alkhatib | .............. | H04L 67/563 |
| | | | | 709/245 |
| 2012/0131162 A1 * | 5/2012 | Brandt | .................... | H04L 41/04 |
| | | | | 709/223 |
| 2017/0286698 A1 * | 10/2017 | Shetty | ..................... | H04L 67/10 |
| 2018/0309658 A1 * | 10/2018 | Parla | ................... | H04L 12/4641 |
| 2019/0097838 A1 * | 3/2019 | Sahoo | ................. | H04L 12/4641 |
| 2019/0327205 A1 * | 10/2019 | Saidumuhamed .. | | H04L 12/4633 |
| 2020/0099675 A1 * | 3/2020 | Mardiks Rappaport | .................... | |
| | | | | H04L 63/1466 |
| 2020/0366639 A1 * | 11/2020 | Saidumuhamed .. | | H04L 12/4633 |
| 2021/0320871 A1 * | 10/2021 | Savarese | ............. | H04L 12/4641 |
| 2022/0021678 A1 * | 1/2022 | Kreger-Stickles | ........................ | |
| | | | | H04L 12/4641 |
| 2022/0263793 A1 * | 8/2022 | Baker | ................. | H04L 61/2557 |
| 2023/0254277 A1 * | 8/2023 | Kalligudd | ........... | H04L 12/4641 |
| | | | | 709/223 |
| 2023/0379304 A1 * | 11/2023 | Niranjan | ............. | H04L 63/0236 |

OTHER PUBLICATIONS

NPL Search Terms (Year: 2026).*
Levin, T., "Private endpoints for Oracle services," Oracle Cloud Infrastructure Blog, dated Mar. 24, 2022.
(Continued)

*Primary Examiner* — Syed A Zaidi
(74) *Attorney, Agent, or Firm* — Vista IP Law Group, LLP

(57) ABSTRACT

Disclosed is an approach to implement a multi-tenant DNS resolver for secure communications for a virtual cloud environment. The approach can perform split-horizon DNS forwarding via an intermediate customized DNS server.

21 Claims, 7 Drawing Sheets

(56) References Cited

OTHER PUBLICATIONS

"Learn about options for private access to Oracle Services," Oracle Help Center, dated Aug. 17, 2020.

Izadkhasti, O., Private connectivity to Oracle Integration Cloud next generation, Medium, dated May 27, 2021.

Kress, J., "Introducing Oracle Cloud API Gateway—the light weight public or private router to public and private OCI endpoints by Lucas Jellema," Oracle Developer Partner Community, dated Oct. 6, 2020.

Carley, D., "Privately Replicating Autonomous Databases Using Native GoldenGate," A-Team Chronicles, dated May 30, 2021.

"Considerations when working with a private hosted zone," AWS, URL: https://docs.aws.amazon.com/Route53/latest/DeveloperGuide/hosted-zone-private-considerations.html, date found via Google as Apr. 19, 2018.

"Amazon Route 53 Announces Private DNS within Amazon VPC," AWS, URL: https://aws.amazon.com/about-aws/whats-new/2014/11/05/amazon-route-53-now-supports-private-dns-with-amazon-vpc/, dated Nov. 5, 2014.

"Route 53 Split-horizon DNS," Jayendra's Cloud Certification Blog, URL: https://jayendrapatil.com/tag/route-53-split-horizon-dns/, dated Aug. 29, 2022.

"Azure Private Link is now generally available," Microsoft, URL: https://azure.microsoft.com/en-us/updates/private-link-now-available-in-ga/, dated Feb. 14, 2020.

"What is Azure Private Link?," Microsoft, URL: https://learn.microsoft.com/en-us/azure/private-link/private-link-overview, dated Feb. 12, 2023.

Khalidi, Y., "Announcing Azure Private Link," Microsoft, URL: https://azure.microsoft.com/en-us/blog/announcing-azure-private-link/, dated Sep. 17, 2019.

Patel, A., "Azure—Azure Private Link Overview," Medium, URL: https://medium.com/awesome-azure/introduction-to-azure-private-link-andprivate-endpoint-and-private-link-service-a61be184356e, dated Mar. 4, 2020.

* cited by examiner

Set up Private Endpoints with Reverse Connection Proxies  202

Generate traffic multitenant instance at Service Provider directed to customer VCN 204

Resolve to a specific Reverse Connection 206

Send traffic to customer VCN using identified RC Proxy 208

Set up private endpoint at
a customer VCN 300

Implement RCE DNS
proxy 302

Update information in
central DB 304

DNS updates mapping
table with any updated
RCE DNS mappings 306

Customer connects 502

Specify target FQDN 504

Initiate query 506

Append unique sequence to FQDN 508

Perform DNS resolution to RCE proxy 510

Forward to appropriate RCE proxy based on unique sequence 512

Translate FQDN to NAT-IP 514

Establish connection 516

MULTI-TENANT RESOLVER FOR PRIVATE COMMUNICATIONS

BACKGROUND

In a cloud computing environment, computing systems may be provided as a service to customers. One of the main reasons for the rising popularity of cloud computing is that the cloud computing model typically allows customers to avoid or minimize both the upfront costs and ongoing costs that are associated with maintenance of IT infrastructures. Moreover, the cloud computing paradigm permits high levels of flexibility for the customer with regards to its usage and consumption requirements for computing resources, since the customer only pays for the resources that it actually needs rather than investing in a massive data center infrastructure that may or may not actually be efficiently utilized at any given period of time.

The cloud resources may be used for any type of purpose or applicable usage configuration by a customer. For example, the cloud provider might host a large number of virtualized processing entities on behalf of the customer in the cloud infrastructure. The cloud provider may provide devices from within its own infrastructure location that are utilized by the cloud customers. In addition, the cloud provider may provide various services (e.g., database services) to customers from the cloud. As yet another example, the cloud provider may provide the underlying hardware device to the customer (e.g., where the device is located within the customer's own data center), but handle implementation and administration of the device as part of the cloud provider's cloud environment.

Private virtual cloud environments for individual customers may be created within an overall cloud infrastructure. The private cloud environment may permit control over the network environment and configuration by the customer, such as assigning private IP addresses, creating subnets, creating routing tables, and configuring stateful firewalls. Similarly, the cloud provider may be considered to have its own virtual cloud environment(s), since the cloud provider has complete control over the network configurations within any private cloud environments created and configured by the cloud provider.

A customer may choose to implement any suitable set of components/services within its own virtual cloud environment. For example, a cloud customer may choose to implement an on-premises database server and/or a private endpoint/service within its virtual cloud environment. A cloud provider may similarly choose to implement its customer-facing components within its own virtual cloud environment. For example, a cloud provider may become a service provider that offers a cloud-based database service as a service from its own virtual cloud environment. A notable example of a cloud-based database is the Oracle Autonomous Database, which is available from Oracle Corporation. The Oracle Autonomous Database is an autonomous data management product in the cloud that provides automated patching, upgrades, tuning, and database maintenance tasks while the system is running, without human intervention. This autonomous database cloud product is self-managing, self-securing, and self-repairing, which helps to eliminate manual database management and human errors.

There is often a need for secure and efficient communications to occur between the various virtual cloud environments. A component or service within a customer's private virtual cloud environment may need to communicate with a service or component within a cloud provider's virtual cloud environment. For example, the customer's database in the customer's virtual cloud environment may need to communicate with a cloud provider's database component/service that is located within a cloud provider's (e.g., service provider's) virtual cloud environment.

Private access options may be created to permit private communications between different private cloud environments, or between a customer's on-premises network and a cloud provider's cloud environment. These private access options are configured such that communications traffic between the different virtual cloud environments are sent through a set of private access components instead of the public internet. A private communications component may be placed within the customer's virtual cloud environment that is used to communicate in the direction to the cloud provider's service within the cloud provider's virtual cloud environment, and another private communications component may be placed within the cloud provider's virtual cloud environment that is used to communicate in the other direction to the customer's virtual cloud environment.

The issue with conventional private access options is that there may be problems when using these private access options in a multi-tenancy environment. For example, in a multi-tenancy environment where multiple different customers share the same instance of a component or service at the cloud provider's virtual cloud environment, it may be difficult to properly identify and use the specific private communications component for a specific customer. This is because a limit may be imposed upon the shared instance for the number of private communications components that can be associated with the shared instance. Therefore, if the number of tenants for the shared instance exceeds the number of private communications components that can be associated with the shared instance, then it would not be possible with conventional private access systems to properly coordinate communications using the private access options to send private traffic from the cloud provider's virtual cloud environment to all of the customers/tenants at the multiple different customer virtual cloud environments.

Therefore, there is a need for an improved approach to implement a solution that addresses the issues identified above.

SUMMARY

Some embodiments are directed to an approach to implement a multi-tenant DNS resolver for secure communications for a virtual cloud environment.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Some embodiments are directed to an approach to implement a multi-tenant DNS resolver for secure communications for a virtual cloud environment.

Figure 1:
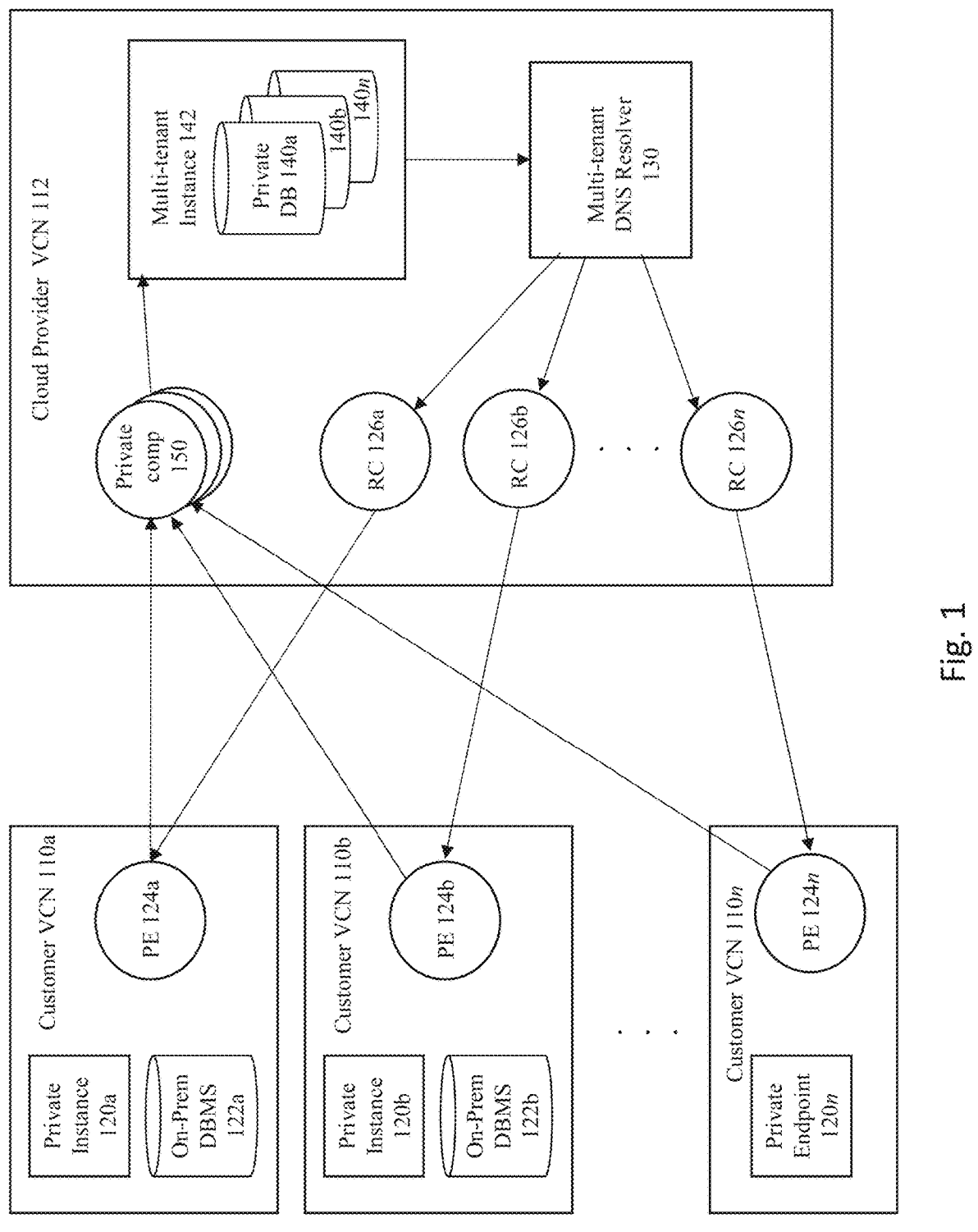
FIG. 1 provides a high level illustration of the invention according to some embodiments of the invention.

FIG. 1 provides a high level illustration of the invention according to some embodiments. This figure shows a cloud-based computing system that includes a cloud provider virtual cloud environment and one or more virtual cloud environments for one or more cloud customers. For purposes of explanation, this document may also refer to a virtual cloud environment using the terms "virtual cloud network" or "VCN".

A VCN can be implemented as a virtual, private network that is set up in a data center (e.g., a data center managed by the cloud provider and/or within the customer's own data center). The VCN resembles a traditional network, with firewall rules and specific types of communication gateways that can be chosen by the customer. Just like a traditional data center network, the VCN provides the customer with control over the cloud networking environment, including the ability assign private IP address spaces, create subnets and routing tables, and configure stateful firewalls. With regards to subnets, subdivisions can be defined in a VCN (for example, 10.0.0.0/24, 10.0.1.0/24, or 2001:DB8::/64). Each subnet includes a contiguous range of IP addresses (for IPv4 and IPv6, if enabled) that do not overlap with other subnets in the VCN.

A virtual network interface card (VNIC) attaches to an instance and resides in a subnet to implement a connection to the subnet's VCN. The VNIC determines how the instance connects with endpoints inside and outside the VCN. Each instance has a primary VNIC that is created during instance launch. One or more secondary VNICs may be added to an existing instance, where each secondary VNIC can be in a subnet in the same VCN as the primary VNIC, or in a different subnet that is either in the same VCN or a different one. The VNICs in a given subnet use the same route table, security lists, and DHCP options. The subnet can be designed as either public or private when created, where the term "private" in this context means that VNICs in the subnet can be configured to not have public IPv4 addresses and to prohibit internet communication with IPv6 endpoints, and the term "public" in this context means that VNICs in the subnet can have public IPv4 addresses and internet communication is permitted with IPv6 endpoints. A private IP address (e.g., IPv4 address) and related information for addressing an instance (for example, a hostname for DNS) may be created. Each VNIC has a primary private IP, and one can add and remove secondary private IPs. The primary private IP address on an instance does not change during the instance's lifetime and cannot be removed from the instance.

In the illustrative architecture of FIG. 1, shown are a plurality of customer VCNs 110a, 110b, through 110n. These customer VCNs interact with one or more cloud provider VCNs 112, which may also be referred to herein as a "service provider VCN" when operated to provide a service. The cloud provider VCN 112 is located within a cloud-based environment that corresponds to any environment that may be provided by a cloud provider and which includes cloud-based resources such as one or more cloud-based servers. The customer VCN 110a-n is located within an environment that may include cloud-related infrastructure/computing resources that are usable by the customer, such as a data center and/or within a cloud environment managed by a cloud provider (which may be the same or different cloud provider from the provider of VCN 112). In some embodiments, 110a-n are also considered service provider VCNs because of where private endpoints reside (private endpoints are described in more detail below), and the customers may have their own on-prem infrastructure that bridges to the service provider's VCN via a fast connection VPN. Thus, in some embodiments, the VCN having the private endpoints may still be residing within a service provider's Infrastructure that is provided for use to the customer.

Each of the customer VCNs may include one or more components managed and/or operated by or for the customer. For example, customer VCNs 110a and 110b may each include a database 122a and 122b, respectively, which can each be used to implement an on-premises database management system. These customer VCNs 110a and 110b may include local private instances 120a and 120b of a system or application (such as a database application) that locally resides within the customer VCN. It is noted that the invention is not limited only to database-related systems and applications, and as illustrated in customer VCN 110n, this VCN is shown as including a generic private endpoint 120*n*. It is also noted that the terms "on-prem" or "on-premises" may refer to a DBMS inside the customer's VCN, or to a DBMS that is outside of the service/cloud provider's VCN, but is hosted by the customer's real-world on-prem infrastructure. Database 122*a* falls into the category where the DBMS is inside the customer's VCN which is a general on-prem situation, but it should be appreciated that the invention is not limited to any specific configuration of an on-prem environment, and indeed, is applicable to a wide variety of configurations beyond just the configuration shown in FIG. 1.

The components within the customer VCNs 110*a-n* may need to communicate to and/or from another component within the cloud provider VCN 112. For example, shown in this figure is a multi-tenant instance 142 that may be used to host private cloud-based databases 140*a-n* as a service on behalf of the customers associated with customer VCNs 110*a-n*. Each of the private cloud-based databases 140*a-n* is a separate virtual database that is configured and managed by the multi-tenant instance 142. The multi-tenant instance 142 may be implemented, for example, as a virtual machine that instantiates multiple tenant databases, e.g., where the database operates as container database (CDB). A CDB consolidates multiple pluggable databases (PDB), and implements a portable collection of schemas, schema objects, and non-schema objects.

A container can be implemented as either a PDB or root, where the root container is a collection of schemas, schema objects, and non-schema objects to which the PDBs belong. The CDB includes a root, which stores metadata and common users. The CDB may also include a seed PDB, which is a system-supplied template that the CDB can use to create new PDBs. One or more user-created PDBs may also exist in the CDB, where the PDB corresponds to a user-created entity that contains the data and code required for a specific set of features. For example, a PDB can support a specific application, such as a human resources or sales application. The advantage of this approach for a multi-tenant database is with regards to resource usage and database consolidation. Database consolidation is the process of consolidating data from multiple databases into one database on one computer. Using the multitenant architecture for database consolidation provides benefits for cost reduction, since by consolidating hardware and database infrastructure to a single set of background processes, and efficiently sharing computational and memory resources, this reduces costs for hardware and maintenance tasks/expenses. This also provides advantages for easier management and monitoring of the physical database, as well as efficiencies for performance tuning.

The customer may desire to use a private access option to securely communicate from the customer VCN to a service within the cloud provider VCN, where the communications traffic does not pass over the public internet. One approach to implement the private access option is to use the concept of a "private endpoint". A private endpoint (PE) is a private IP address within the customer VCN that can be used to access a given service within a remote cloud infrastructure. The service sets up the private endpoint in a chosen subnet within the VCN. By way of explanation, one can think of the private endpoint as just another VNIC in the VCN, where the customer can control access to it like any other VNIC, e.g., by using one or more security rules. However, a management service is used by the cloud provider to set up this VNIC and maintain its availability on the customer's behalf. The customer only needs to maintain the subnet and the security rules. The private endpoint gives hosts within the VCN and the on-premises network access to a resource within a service of interest (for example, to an autonomous database).

The management service that sets up the private endpoint in the customer VCN may provide a DNS name, e.g., a fully qualified domain name (FQDN), for the PE, in addition to or instead of a private IP address. If the network setup is configured for DNS, then hosts can access the private endpoint using the FQDN. If a PE is set up for a resource, then hosts within the VCN can use the private endpoint's FQDN or private IP address to access the resource. Transit routing may also be configured such that hosts in an on-premises network can use the private endpoint. This may be implemented, for example, setting up an instance in the VCN to be a custom DNS server.

As shown in FIG. 1, each of the customer VCNs 110*a-n* may be configured to include a respective PEs 124*a-n*. Communications traffic from these PEs may be routed to a service at the cloud 'provider' VCN 112 through one or more private communication components 150. For example, with regards to the one or more private communication components 150, traffic may be received at the cloud provider VCN at a private service gateway, which may interact with one or more load balancers and/or service endpoints, which may then be sent to the backend instance 142.

In the reverse direction, one or more reverse connection endpoints (RCEs) 126*a-n* may be configured to send communications traffic from the service provider VCN 112 to the PE 124*a-n* in the customer VCNs 110*a-n*. In some embodiments, the communications traffic sent through the PE may include DNS traffic, where data traffic is separately routed via a private access gateway (PAGW) to PE DP fleet (PE data plane between customer VCN and service VCN) once the target FQDN is resolved.

In one approach to implement the reverse connection, a NAT-IP based approach is used. Given a private IP inside the customer's VCN where the private endpoint exists, a translation can be performed to a Class-E NAT-IP (240.0.0.0/4), where the RC traffic can be established targeting that NAT-IP and routed from the service provider's VCN back to the customer's VCN via the PE. In a second approach, an RCE DNS proxy based approach is taken. Instead of providing a private IP directly, the customer can specify an FQDN (e.g. instance hostname) of the resource inside the customer's VCN. By using the RCE DNS proxy, the DNS query can be forwarded to the customer's VCN for resolution. The query results can also be a class-E NAT-IP on which the RCE traffic can be established.

In the second approach described above, this approach operates correctly if the service provider spins up a separate VM (virtual machine) instance for each individual customer. However, a problem arises if a multi-tenant instance is employed, since there may be a limit on the number of name servers that may be configured for a given VM instance. For example, for a Linux-based VM, the Linux "/etc/resolv.conf" setting is able to specify only up to three name servers, which is problematic if the service provider manages resources for multiple customers on one VM, since the resolv.conf file on that VM is not able to achieve a multi-tenant DNS resolution.

In the case of a multi-tenant instance 142 that implements an autonomous database, there may be many PDBs in a CDB hosted on one POD/VM. These PDBs may belong to different tenancies, and each PDB consumes a slice of resources (e.g. CPU, memory, disk) on the VM. When different customers connect to their PDBs (and, for example, use the utl_http or dblink package), the traffic is initiated from the same VM. As noted above, this is problematic if the multi-tenant has a limit on the number of name servers that may be configured for the instance. This is especially problematic when the private targets in the destination VCN are denoted by a Fully Qualified Domain Name (FQDN). This is because there is no straightforward way to split-horizon to multi-tenant communication using the Linux built-in DNS configuration because it limits the number of name servers that can be used for resolution.

The solution to this problem according to some embodiments of the invention is to provide a multi-tenant DNS resolver 130 that use forwarding rules to resolve which specific RCE DNS proxy should be employed for any given traffic to be sent from the cloud provider VCN to a specific customer VCN.

Figure 2:
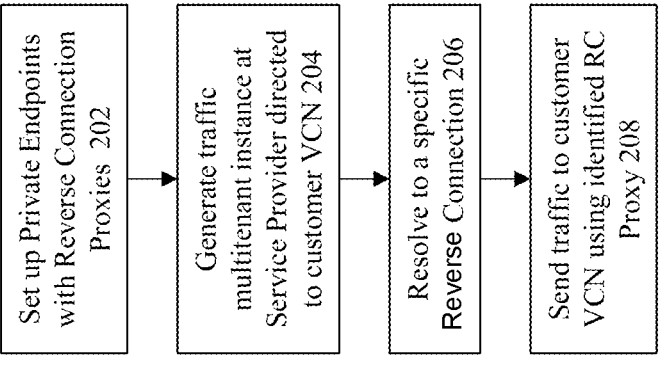
FIG. 2 shows a high level flowchart of an approach to implement some embodiments of the invention.

FIG. 2 shows a high level flowchart of an approach to implement some embodiments of the invention. At 202, private endpoints with reverse connection endpoints are set up for a customer. This action instantiates and configures the PE and RCE for a given customer VCN to access a given service endpoint within the cloud provider VCN. In addition, as described in more detail below, DNS forwarding rules may be configured to implement a multi-tenant DNS resolver.

At 204, traffic is generated from the multi-tenant instance that is intended to be sent to the customer VCN. The communication traffic may be modified so that the traffic is identifiable as being associated with a given customer PE. For example, as described in more detail below, a suffix can be appended to the FQDN that includes a unique identifier associated with a RCE proxy.

At 206, the communications traffic is resolved to a specific RCE proxy. This action is performed based upon a set of forwarding rules that can be accessed by a DNS server (e.g., a customized DNS server). In one embodiment, the forwarding rule operates by looking at the suffix, and then maps that suffix to the address associated with a RCE proxy for the appropriate PE.

At 208, the communications traffic can be sent to the RCE proxy. The traffic is then forwarded to the PE for the specific customer VCN that is the intended destination for the traffic. Once the message is received at the PE at the customer VCN, the message is then passed to the intended component within the customer VCN.

It is noted that any suitable type of traffic may be handled using the current invention. For example, DNS communications traffic may be sent through the RCE proxy. Once it resolves, the client side will receive a class-E range (NAT-IP, 240.0.0.0/4) for connection. The client will then establish the connection and send data traffic to that NAT-IP via a private access gateway to a PE DP fleet that is located between the customer VCN and the service VCN, and which will eventually go through the PE to the customer's target.

Figure 3:
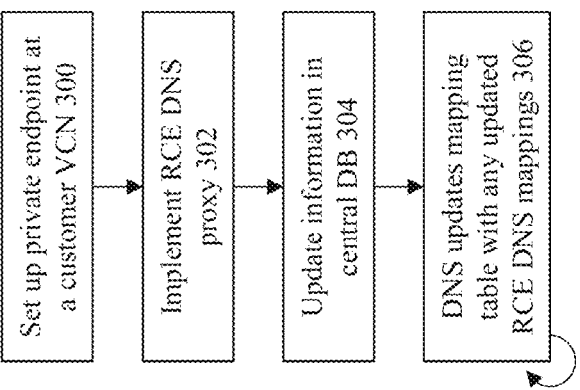
FIG. 3 shows a detailed illustration of an approach to implement a setup stage according to some embodiments of the invention.

FIG. 3 shows a detailed illustration of an approach to implement a setup stage according to some embodiments of the invention. This setup stage will configure and set up the forwarding rules for the multi-tenant DNS resolver. This figure may be illustratively explained in conjunction with the detailed architecture diagram of FIG. 4.

Figure 4:
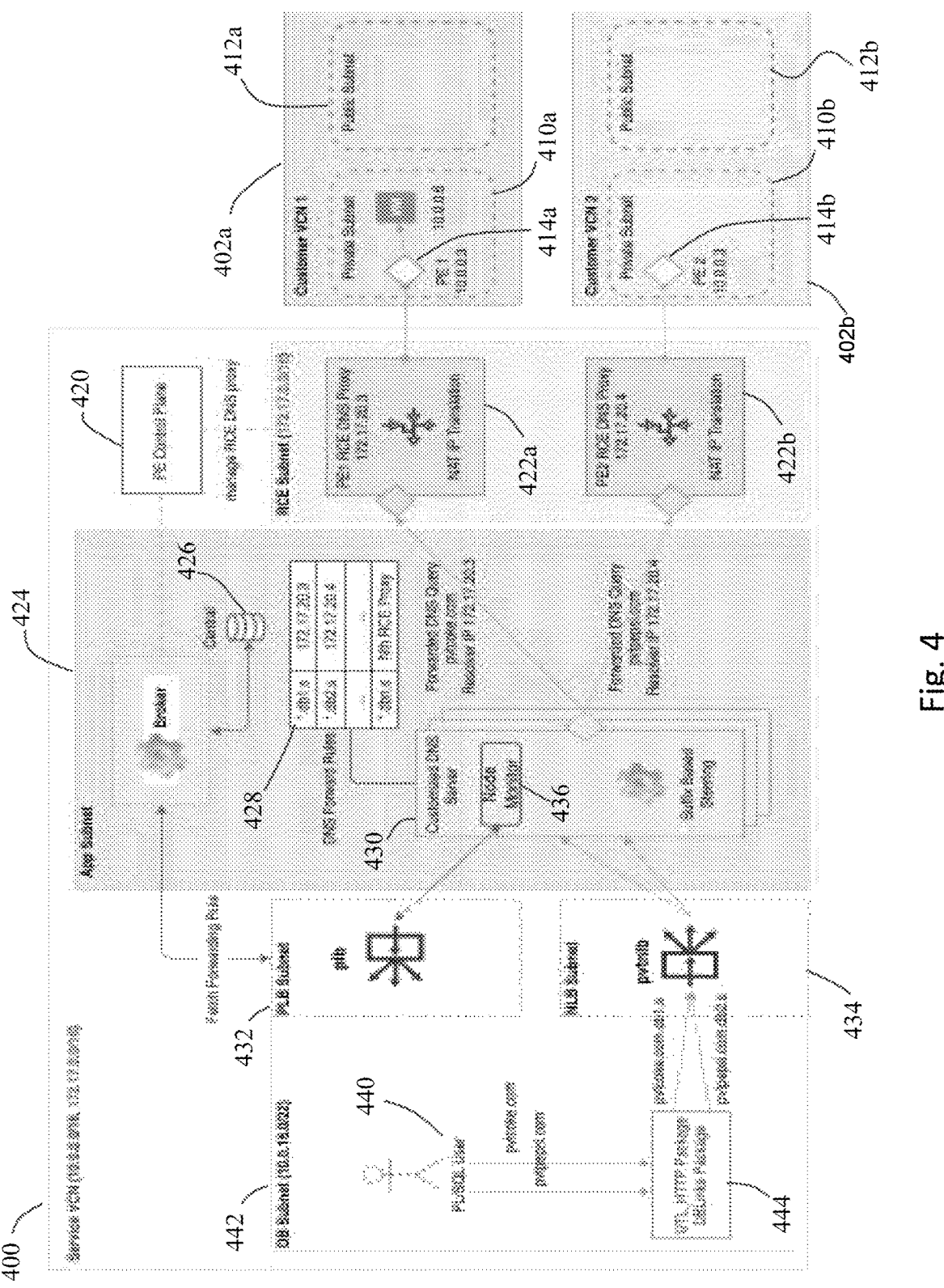
FIG. 4 provides a detailed illustration of an architecture for the invention according to some embodiments.

At step 300, a private endpoint is set up at a customer VCN. FIG. 4 shows two example customer VCNs 402a and 402b. Each of these customer VCNs may include both a private subnet and a public subnet. For example, customer VCN 402a may include a private subnet 410a and a public subnet 412a. Similarly, customer VCN 402b may include a private subnet 410b and a public subnet 412b. At step 300, a private endpoint is set up within the private subject for each of these customer VCNs. Here, a PE 414a is set up within the private subnet 410a for customer VCN 402a, and a PE 414b is set up within the private subnet 410b for customer VCN 402b.

At step 302, an RCE proxy is configured for each of the customer VCNs. As shown in FIG. 4, PE control plane 420 is employed within a service provider VCN 200 to manage RCE DNS proxies. The PE control plane includes functionality to instantiate the RCE DNS proxies. A broker component 424 may be employed to instruct the control plane 420 to take these actions. The broker component is configured with information about which customer DB at the service provider VCN 400 is associated with a given customer PE (and its associated RCE).

In the example of FIG. 4, the PE control plane 420 has implemented a first RCE proxy 422a that corresponds to PE 414a for the customer VCN 402a. This RCE proxy 422a is responsible for performing the NAT IP translation that allows communications traffic to be forwarded from the service provider VCN 400 to the specific customer VCN 402a that is directly associated with the RCE proxy 422a. Similarly, the PE control plane 420 has also implemented a second RCE proxy 422b that corresponds to PE 414b for the customer VCN 402b, and this second RCE proxy 422b is responsible for performing the NAT IP translation that allows communications traffic to be forwarded from the service provider VCN 400 to the second customer VCN 402b that is directly associated with the second RCE proxy 422b.

At step 304, a central database 426 is updated with an entry that correlates a specific customer database (e.g., associated with a FQDN) with the RCE proxy that has been created. In some embodiments, each entry (e.g., each row) within the central DB 426 includes a column that identifies a given customer database identifier, as well as a second column that identifies the IP address associated with its corresponding RCE DNS proxy.

On a periodic and/or on an as-needed basis, at step 306, a set of DNS forwarding rules 428 are updated to reflect information that has been placed into the central DB 426. The DNS forwarding rules 428 are a set of rules that are used to identify a specific RCE proxy from among multiple RCE proxies for a given communication, and which therefore facilitates the forwarding instructions to forward the communications to the identified RCE proxy.

In one embodiment, the DNS forwarding rules 428 are stored as entries within a tabular structure having a first column that matches content within the communications that is unique to a given RCE proxy. As described in more detail below, the current embodiment uses a suffix that is appended to the FQDN for the communications traffic which includes a string that identifies a specific and unique customer database. Therefore, this suffix (either in whole or in part) is included within the first column of the table for the DNS forwarding rules 428. A second column includes information that uniquely identifies a specific RCE proxy associated with the suffix in the first column. In the current example, the second column include the IP address for the RCE proxy. Each row in the table includes forwarding information for a different database and RCE proxy combination.

The information within the DNS forwarding rules 428 may be updated using either a pull model or a push model. In the current embodiment, a pull model is employed. A node monitor 436 within a DNS server 430 operates to monitor and manage updates to the DNS forwarding rules 428. On a periodic basis, the node monitor 436 interfaces with a load balancer (e.g., a private load balancer 432) to contact a broker 424 (possibly from among multiple such brokers) to retrieve information from the central DB 426. The retrieved information corresponds to any changed information within the central DB 426 that may have occurred since the last time the central DB was checked. The retrieved information is sent back to the node monitor 436 and is used to update the DNS forwarding rules 428. This pull model is used to facilitate horizontally scaling and to avoid excessive concurrent write IOs.

Figure 5:
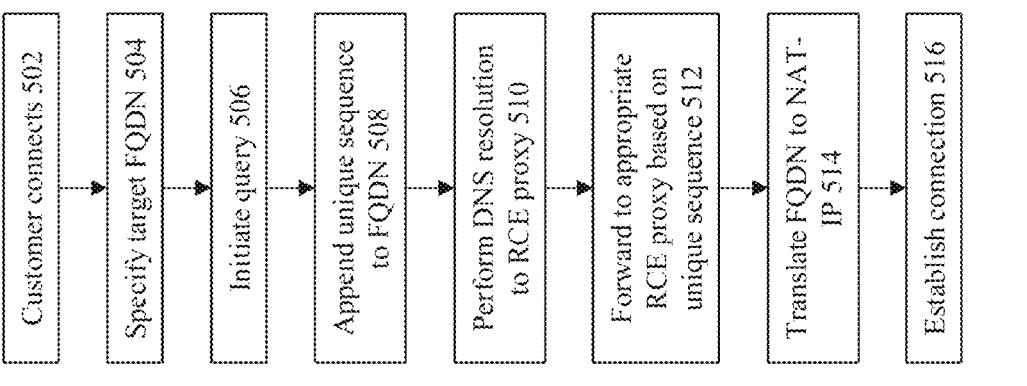
FIG. 5 shows a detailed flowchart of an approach to implement a multi-tenant DNS resolver to forward communications to a selected RCE proxy according to some embodiments of the invention.

FIG. 5 shows a detailed flowchart of an approach to implement the usage of the multi-tenant DNS resolver to forward communications to a selected RCE proxy according to some embodiments of the invention.

At 502, the customer connects to a service within a multi-tenant instance of the service provider's VCN. For example, in the context of an autonomous database service, the customer may connect to the customer's database within a multi-tenant instance for the autonomous database service.

At 504, the customer may take an action that targets a specific target FQDN. For example, from the autonomous database, the customer may attempt to create a link between the customer's database within the multi-tenant instance in the service provide VCN 400 and the customer's on-prem database within the customer VCN 402a. This link may be implemented, for example, by creating a DBLink that specifies the target FQDN (e.g., a DB system instance) that is resolvable inside the customer's VCN.

At 506, the customer may perform an action that will result in communications that need to be sent from the service provider VCN to the customer VCN over the RCE proxy, e.g., where DNS traffic is sent to the RCE proxy. For example, the customer may issue a "select" SQL statement that needs to be processed according to the DBlink (e.g., the SQL statement may require multiple tables to be joined from across the two VCNs), and this results in a DNS query to be sent.

At 508, a unique suffix is appended to the FQDN pertaining to the customer input. The DBLink code will append a unique suffix to the FQDN that customer has provided as the input. In the current embodiment, the unique suffix corresponds to the identified FQDN, e.g., an identifier for the customer database.

To illustrate this action, consider a customer user 440 within a DB subnet 442 as shown in FIG. 4. Here, the customer user may seek to communicate with either of two separate FQDNs "pvtcoke.com" or "pvtpepsi.com". The customer may invoke a DBlinks package 44 to establish a DBlink with these FQDNs. Each of these FQDNs is associated with a different database identifier. For example, the first FQDN "pvtcoke.com" may be associated with a first identifier "db1" and the second FQDN "pvtpepsi.com" may be associated with a second identifier "db2".

For communications traffic associated with the first FQDN "pvtcoke.com", the FQDN may be modified to include a suffix that include the first identifier "db1". Thus, "pvtcoke.com" may be modified to become "pvtcoke.com.db1.s" (where the ".s" corresponds to any additional desired suffix information). The rightmost suffix "s", can be used by a service VCN resolver to bifurcate a DNS query. The service VCN resolver will forward the DNS query with "s" to a multi-tenant DNS resolver and which will be eventually resolved inside the customer's VCN where the PE resides. The DNS query without the "s" will be resolved from the public internet, and eventually the data traffic will be sent to that target directly over public internet. It is noted that the customer may have a choice to resolve a public target inside their VCN resolver. In that case the data traffic route will be from a Pod, to a customer VCN, and then to the public internet, where there is an extra middle hop before the traffic is sent to the public internet as opposed to directly reaching the public from a Pod.

Similarly, for communications traffic associated with the second FQDN "pvtpepsi.com", the FQDN may be modified to include a suffix that include the second identifier "db2". Thus, "pvtpepsi.com" may be modified to become "pvtpepsi.com.db.s".

What happens next, at step 510, is that a DNS query will be sent to a service VCN resolver to resolve to the correct RCE proxy. The communications may pass to a load balancer (e.g., a network load balancer 434) and sent to a DNS server 430 to perform the DNS resolution.

The DNS server 430 will inspect the suffix that is attached to the FQDN, and identify matching information to that suffix within the DNS forwarding rules 428. The DNS forwarding rules 428 may include, for example, a rule statement within a column of an entry (e.g., a regular expression) that can match to the suffix of the FQDN statement.

If a match is found within the DNS forwarding rules, then at step 512, the communications is forwarded to the identified RCE proxy from the forwarding rules. Based on the forwarding rule on the DNS server that is fetched from broker periodically, the appropriate RCE proxy is identified from the forwarding rules, e.g., to identify the correct RCE IP address from the second column of the identified entry within the forwarding rules.

It is noted that the DNS server will strip off the suffix, and then forward the traffic with the suffix stripped off to the identified RCE proxy. For example, when the multi-tenant DNS resolver receives "pvtcoke.com.db1.s" it will forward "pvtcoke.com" to a matched RCE proxy. This is how the system maintains transparency to a customer's VCN resolver, since the downstream may not have the requisite context to understand the suffix.

At 514, the RCE proxy will then translate the FQDN to the correct NAT-IP address. For example, the translation action is performed to translate to a class-E range NAT-IP address. This NAT-IP address is then returned back.

At 516, a connection is then established to the customer's VCN. For example, at this point, the DBLink can then establish a connection with the identified NAT-IP. In some embodiments, the PE system guarantees that all class-E range NAT-IP will be correctly routed via a Private Access Gateway (PAGW) to the customer's VCN.

Therefore, what has been disclosed is a fully-manageable, multi-tenant DNS (MTDNS) resolution system that can perform split-horizon DNS forwarding via an intermediate customized DNS server. The MTDNS can be configured to re-use any existing connection components (such as, for example, a forward endpoint, an RCE proxy, a load balancer, etc.) to achieve high availability and performance, and still be highly backward-compatible with existing autonomous database infrastructure components.

By integrating with private endpoints, embodiments of the current invention have efficiently implemented a private access solution for forwarding traffic that supports not just from customer's VCN to autonomous database in the cloud, but also supports reverse traffic from a service VCN to the customer's VCN as well. For example, one use case is for the autonomous databases to communicate back to customer's on-prem databases/services via DBLink/UTL_HTTP. In particular, if customers are inclined to use host FQDN to establish connections then the DNS query can be passed privately to customer's VCN for resolution as well. This uses the mechanism of a reverse connection endpoint which can spawn a RCE proxy per PE for target FQDN resolution. The split horizon of DNS resolution for the current embodiments overcomes any prior limitations of a maximum number of name servers that can be specified on a single host, as well as overcoming any difficulty to map each PE database to their corresponding RCE proxy.

The current embodiment can therefore allow a RCE proxy work under a multi-tenant environment (e.g., multiple customers/tenancies resources are on the same host). With the current DNS resolver, the inventive approach makes suffix based steering transparent to the customers. In addition with the current suffix based zone forwarding approach, the invention can separate the public outgoing traffic versus any private ones. That keeps the highest level of backward compatibility. When a refresh is made to the local forward rules on the customized DNS server, some embodiments use a pull model instead of broker push model. This makes DNS node very easy to scale horizontally, and avoids concurrent write IOs. Since a suffix-based steering is used, any pertinent applications (e.g., based on DBLink/UTL_HTTP) can be integrated with this solution (e.g., by appending the suffix to the FQDN).

System Architecture

Figure 6:
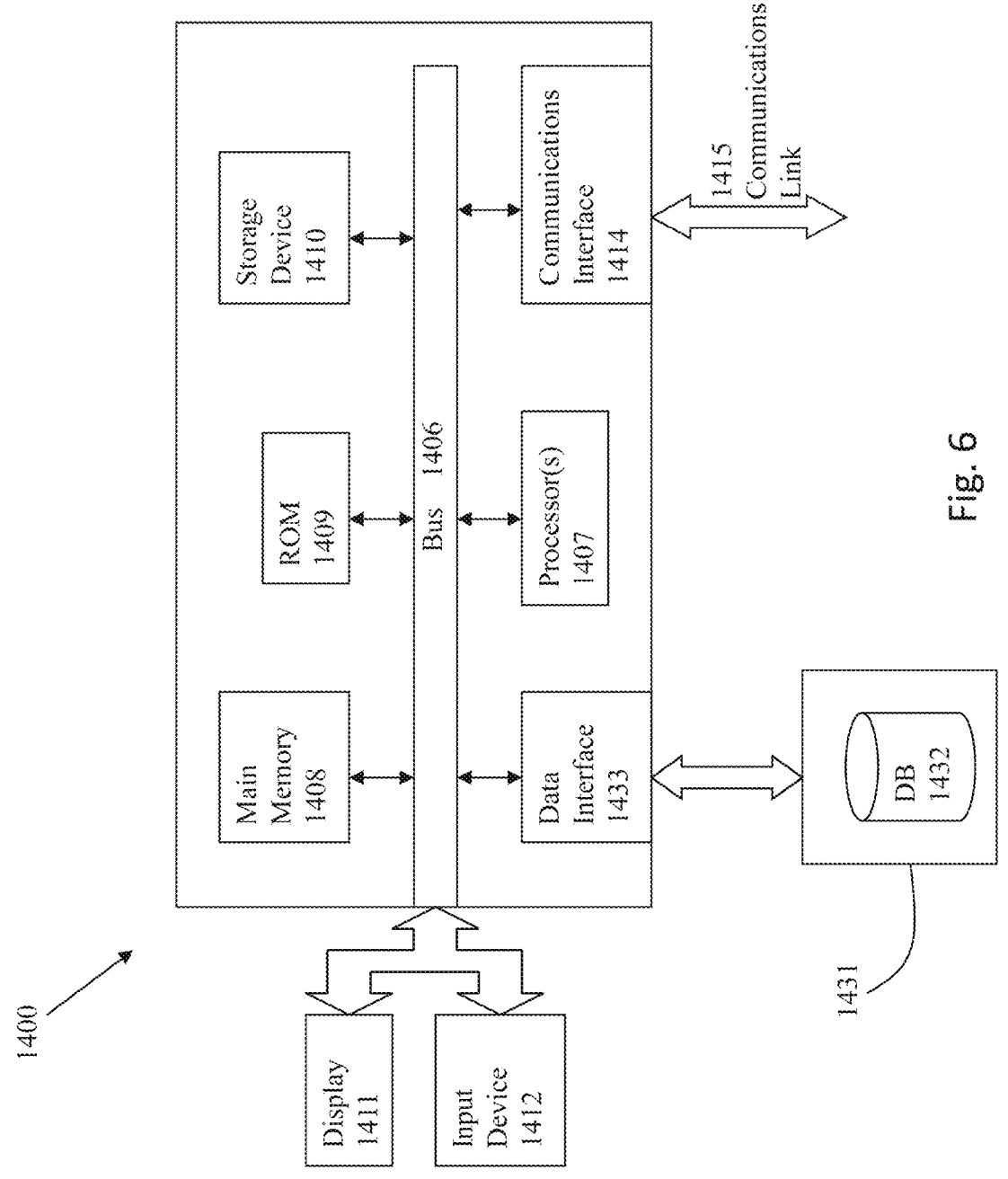
FIG. 6 is a block diagram of an illustrative computing system suitable for implementing an embodiment of the present invention.

FIG. 6 is a block diagram of an illustrative computing system 1500 suitable for implementing an embodiment of the present invention. Computer system 1500 includes a bus 1506 or other communication mechanism for communicating information, which interconnects subsystems and devices, such as processor 1507, system memory 1508 (e.g., RAM), static storage device 1509 (e.g., ROM), disk drive 1510 (e.g., magnetic or optical), communication interface 1514 (e.g., modem or Ethernet card), display 1511 (e.g., CRT or LCD), input device 1512 (e.g., keyboard), and cursor control.

According to some embodiments of the invention, computer system 1500 performs specific operations by processor 1507 executing one or more sequences of one or more instructions contained in system memory 1508. Such instructions may be read into system memory 1508 from another computer readable/usable medium, such as static storage device 1509 or disk drive 1510. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1507 for execution. Such a medium may take many forms, including but not limited to, non-volatile media and volatile media. Non-volatile media includes, for example, optical or magnetic disks, such as disk drive 1510. Volatile media includes dynamic memory, such as system memory 1508.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1500. According to other embodiments of the invention, two or more computer systems 1500 coupled by communication link 1510 (e.g., LAN, PTSN, or wireless network) may perform the sequence of instructions required to practice the invention in coordination with one another.

Computer system 1500 may transmit and receive messages, data, and instructions, including program, i.e., application code, through communication link 1515 and communication interface 1514. Received program code may be executed by processor 1507 as it is received, and/or stored in disk drive 1510, or other non-volatile storage for later execution. A database 1532 in a storage medium 1531 may be used to store data accessible by the system 1500.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 7:
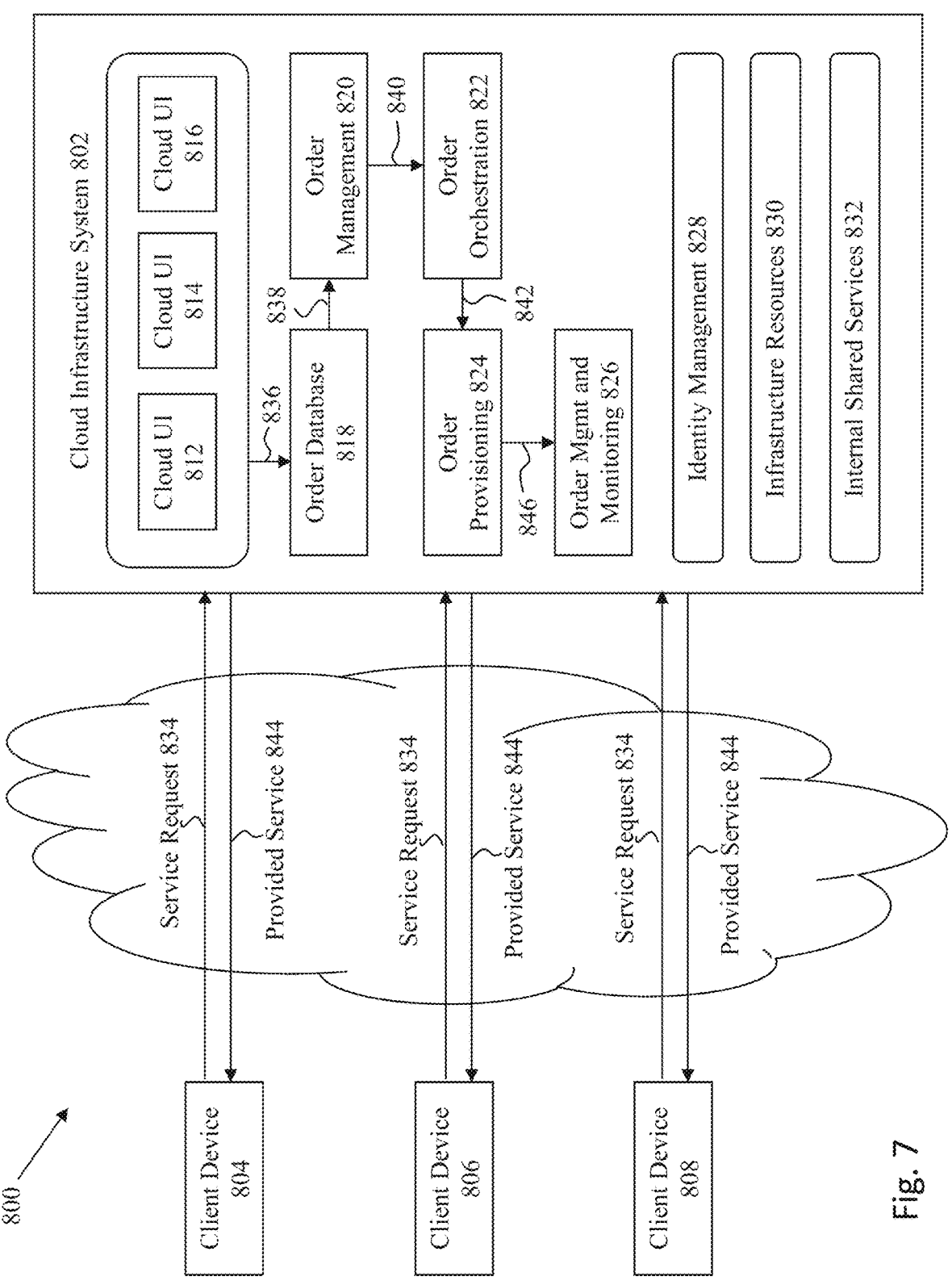
FIG. 7 is a block diagram of one or more components of a system environment in which services may be offered as cloud services, in accordance with an embodiment of the present invention.

FIG. 7 is a simplified block diagram of one or more components of a system environment 1600 by which services provided by one or more components of an embodiment system may be offered as cloud services, in accordance with an embodiment of the present disclosure. In the illustrated embodiment, system environment 1600 includes one or more client computing devices 1604, 1606, and 1608 that may be used by users to interact with a cloud infrastructure system 1602 that provides cloud services. The client computing devices may be configured to operate a client application such as a web browser, a proprietary client application, or some other application, which may be used by a user of the client computing device to interact with cloud infrastructure system 1602 to use services provided by cloud infrastructure system 1602.

It should be appreciated that cloud infrastructure system 1602 depicted in the figure may have other components than those depicted. Further, the embodiment shown in the figure is only one example of a cloud infrastructure system that may incorporate an embodiment of the invention. In some other embodiments, cloud infrastructure system 1602 may have more or fewer components than shown in the figure, may combine two or more components, or may have a different configuration or arrangement of components.

Client computing devices 1604, 1606, and 1608 may be devices similar to those described above for FIG. 6. Although system environment 1600 is shown with three client computing devices, any number of client computing devices may be supported. Other devices such as devices with sensors, etc. may interact with cloud infrastructure system 1602.

Network(s) 1610 may facilitate communications and exchange of data between clients 1604, 1606, and 1608 and cloud infrastructure system 1602. Each network may be any type of network familiar to those skilled in the art that can support data communications using any of a variety of commercially-available protocols. Cloud infrastructure system 1602 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1602 may include a suite of applications, middleware, and database service offerings that are delivered to a customer in a self-service, subscription-based, elastically scalable, reliable, highly available, and secure manner.

In various embodiments, cloud infrastructure system 1602 may be adapted to automatically provision, manage and track a customer's subscription to services offered by cloud infrastructure system 1602. Cloud infrastructure system 1602 may provide the cloud services via different deployment models. For example, services may be provided under a public cloud model in which cloud infrastructure system 1602 is owned by an organization selling cloud services and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some embodiments, the services provided by cloud infrastructure system 1602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some embodiments, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1602 may also include infrastructure resources 1630 for providing the resources used to provide various services to customers of the cloud infrastructure system. In one embodiment, infrastructure resources 1630 may include pre-integrated and optimized combinations of hardware, such as servers, storage, and networking resources to execute the services provided by the PaaS platform and the SaaS platform.

In some embodiments, resources in cloud infrastructure system 1602 may be shared by multiple users and dynamically re-allocated per demand. Additionally, resources may be allocated to users in different time zones. For example, cloud infrastructure system 1602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1632 may be provided that are shared by different components or modules of cloud infrastructure system 1602 and by the services provided by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1602, and the like.

In one embodiment, as depicted in the figure, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In operation 1634, a customer using a client device, such as client device 1604, 1606 or 1608, may interact with cloud infrastructure system 1602 by requesting one or more services provided by cloud infrastructure system 1602 and placing an order for a subscription for one or more services offered by cloud infrastructure system 1602. In certain embodiments, the customer may access a cloud User Interface (UI), cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 that the customer intends to subscribe to.

After an order has been placed by the customer, the order information is received via the cloud UIs, 1612, 1614 and/or 1616. At operation 1636, the order is stored in order database 1618. Order database 1618 can be one of several databases operated by cloud infrastructure system 1618 and operated in conjunction with other system elements. At operation 1638, the order information is forwarded to an order management module 1620. In some instances, order management module 1620 may be configured to perform billing and accounting functions related to the order, such as verifying the order, and upon verification, booking the order. At operation 1640, information regarding the order is communicated to an order orchestration module 1622. Order orchestration module 1622 may utilize the order information to orchestrate the provisioning of services and resources for the order placed by the customer. In some instances, order orchestration module 1622 may orchestrate the provisioning of resources to support the subscribed services using the services of order provisioning module 1624.

In certain embodiments, order orchestration module 1622 enables the management of business processes associated with each order and applies business logic to determine whether an order should proceed to provisioning. At operation 1642, upon receiving an order for a new subscription, order orchestration module 1622 sends a request to order provisioning module 1624 to allocate resources and configure those resources needed to fulfill the subscription order. Order provisioning module 1624 enables the allocation of resources for the services ordered by the customer. Order provisioning module 1624 provides a level of abstraction between the cloud services provided by cloud infrastructure system 1602 and the physical implementation layer that is used to provision the resources for providing the requested services. Order orchestration module 1622 may thus be isolated from implementation details, such as whether or not services and resources are actually provisioned on the fly or pre-provisioned and only allocated/assigned upon request.

At operation 1644, once the services and resources are provisioned, a notification of the provided service may be sent to customers on client devices 1604, 1606 and/or 1608 by order provisioning module 1624 of cloud infrastructure system 1602.

At operation 1646, the customer's subscription order may be managed and tracked by an order management and monitoring module 1626. In some instances, order management and monitoring module 1626 may be configured to collect usage statistics for the services in the subscription order, such as the amount of storage used, the amount data transferred, the number of users, and the amount of system up time and system down time.

In certain embodiments, cloud infrastructure system 1602 may include an identity management module 1628. Identity management module 1628 may be configured to provide identity services, such as access management and authorization services in cloud infrastructure system 1602. In some embodiments, identity management module 1628 may control information about customers who wish to utilize the services provided by cloud infrastructure system 1602. Such information can include information that authenticates the identities of such customers and information that describes which actions those customers are authorized to perform relative to various system resources (e.g., files, directories, applications, communication ports, memory segments, etc.) Identity management module 1628 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method, comprising:

identifying a private endpoint in a service provider virtual cloud network (VCN), wherein the private endpoint corresponds to a fully qualified domain name (FQDN) that denotes a target in a customer VCN, and the service provider VCN comprises a multi-tenant service instance;

generating communications traffic at the multi-tenant service instance, wherein the communications traffic is to be sent to the target in the customer VCN;

identifying, using a set of Domain Name Service (DNS) forwarding rules and the FQDN, a proxy of the service provider VCN for sending the communications traffic to the target in the customer VCN; and sending the communications traffic to the identified proxy and causing the communications traffic to be forwarded to the target in the customer VCN using the identified proxy.

2. The computer implemented method of claim 1, the identified proxy comprising a reverse connection endpoint (RCE) proxy of the service provider VCN, wherein the RCE proxy is associated with the FQDN, the communications traffic comprises DNS traffic, a multi-tenant resolver uses the DNS forwarding rules to forward the DNS traffic to the RCE proxy, and the FQDN corresponds to the private target at the customer VCN.

3. The computer implemented method of claim 1, further comprising modifying the communications traffic, wherein the communications traffic is modified to include a suffix having an identifier associated with the identified proxy, the set of DNS forwarding rules correlates specific identifiers to specific proxies, and the identified proxy is identified by matching the identifier to a corresponding rule within the set of DNS forwarding rules.

4. The computer implemented method of claim 3, wherein the suffix is added to the FQDN.

5. The computer implemented method of claim 3, wherein the suffix is stripped off of the FQDN before forwarding the communications traffic to the target in the customer VCN.

6. The computer implemented method of claim 1, wherein a setup stage configures the set of DNS forwarding rules by:

setting up the private endpoint in the service provider VCN;

configuring the identified proxy when the private endpoint in the service provider VCN is set up;

storing information into a database for the private endpoint of the service provider VCN, wherein the information correlates the identified proxy to the FQDN; and updating the set of DNS forwarding rules with the information from the database that correlates the identified proxy to the FQDN.

7. The computer implemented method of claim 1, wherein the multi-tenant service instance comprises a multi-tenant database service, and the communications traffic corresponds to establishment of a link between the multi-tenant database service at the service provider VCN and an on-premises database at the customer VCN.

8. A non-transitory computer program product embodied on a computer usable medium, the computer usable medium having stored thereon a sequence of instructions which, when executed by a processor causes the processor to execute actions comprising:

identifying a private endpoint in a service provider virtual cloud network (VCN), wherein the private endpoint corresponds to a fully qualified domain name (FQDN) that denotes a target in a customer VCN, and the service provider VCN comprises a multi-tenant service instance;

generating communications traffic at the multi-tenant service instance, wherein the communication traffic is to be sent to the target in the customer VCN;

identifying, using a set of Domain Name Service (DNS) forwarding rules and the FQDN, a proxy of the service provider VCN for sending the communications traffic to the target in the customer VCN; and sending the communications traffic to the identified proxy and causing the communications traffic to be forwarded to the target in the customer VCN using the identified proxy.

9. The non-transitory computer program product of claim 8, the identified proxy comprising a reverse connection endpoint (RCE) proxy of the service provider VCN, wherein the RCE proxy is associated with the FQDN, the communications traffic comprises DNS traffic, a multi-tenant resolver uses the DNS forwarding rules to forward the DNS traffic to the RCE proxy.

10. The non-transitory computer program product of claim 8, the actions executed by the processor further comprising modifying the communications traffic, wherein the communications traffic is modified to include a suffix having an identifier associated with the identified proxy, the set of DNS forwarding rules correlates specific identifiers to specific proxies, and the identified proxy is identified by matching the identifier to a corresponding rule within the set of DNS forwarding rules.

11. The non-transitory computer program product of claim 10, wherein the suffix is added to the FQDN.

12. The non-transitory computer program product of claim 10, wherein the suffix is stripped off of the FQDN before forwarding the communications traffic to the target in the customer VCN.

13. The non-transitory computer program product of claim 8, wherein a setup stage configures the set of DNS forwarding rules, and the actions further comprise:

setting up the private endpoint in the service provide VCN;

configuring the identified proxy when the private endpoint in the service provider VCN is set up;

storing information into a database for the private endpoint of the service provider VCN, wherein the information correlates the identified proxy to the FQDN; and updating the set of DNS forwarding rules with the information from the database that correlates the identified proxy to the FQDN.

14. The non-transitory computer program product of claim 8, wherein the multi-tenant service instance comprises a multi-tenant database service, and the communications traffic corresponds to establishment of a link between the multi-tenant database service at the service provider VCN and an on-premises database at the customer VCN.

15. A computer-based system, comprising:

a computer processor to execute a set of program code instructions;

a memory to hold the program code instructions, in which the program code instructions comprises program code for identifying a private endpoint in a service provider virtual cloud network (VCN), wherein the private endpoint corresponds to a fully qualified domain name (FQDN) that denotes a target in a customer VCN, and the service provider VCN comprises a multi-tenant service instance;

generating communications traffic at the multi-tenant service instance, wherein the communications traffic is to be sent to the target in the customer VCN;

identifying, using a set of Domain Name Service (DNS) forwarding rules and the FQDN, a proxy of the service provider VCN for sending the communications traffic to the target in the customer VCN; and sending the communications traffic to the identified proxy and causing the communications traffic to be forwarded to the target in the customer VCN using the identified proxy.

16. The computer-based system of claim 15, the identified proxy comprising a reverse connection endpoint (RCE) proxy of the service provider VCN, wherein the RCE proxy is associated with the FQDN, the communications traffic comprises DNS traffic, a multi-tenant resolver uses the DNS forwarding rules to forward the DNS traffic to the RCE proxy.

17. The computer-based system of claim 15, the program code instructions comprising program code for modifying the communications traffic, wherein the communications traffic is modified to include a suffix having an identifier associated with the identified proxy, the set of DNS forwarding rules correlates specific identifiers to specific proxies, and the identified proxy is identified by matching the identifier to a corresponding rule within the set of DNS forwarding rules.

18. The computer-based system of claim 17, wherein the suffix is added to the FQDN.

19. The computer-based system of claim 17, wherein the suffix is stripped off of the FQDN before forwarding the communications traffic to the target in the customer VCN.

20. The computer-based system of claim 15, wherein a setup stage configures the set of DNS forwarding rules, and the program code instructions further comprises additional program code for:

setting up the private endpoint in the service provider VCN;

configuring the identified proxy when the private endpoint in the service provider VCN is set up;

storing information into a database for the private endpoint of the service provider VCN, wherein the information correlates the identified proxy to the FQDN; and updating the set of DNS forwarding rules with the information from the database that correlates the identified proxy to the FQDN.

21. The computer-based system of claim 15, wherein the multi-tenant service instance comprises a multi-tenant database service, and the communications traffic corresponds to establishment of a link between the multi-tenant database service at the service provider VCN and an on-premises database at the customer VCN.

* * * * *